Sept. 10, 1929.   R. A. CARLETON   1,727,585
FLUID HEATING AND VAPORIZING APPARATUS
Filed Aug. 23, 1927   3 Sheets-Sheet 1
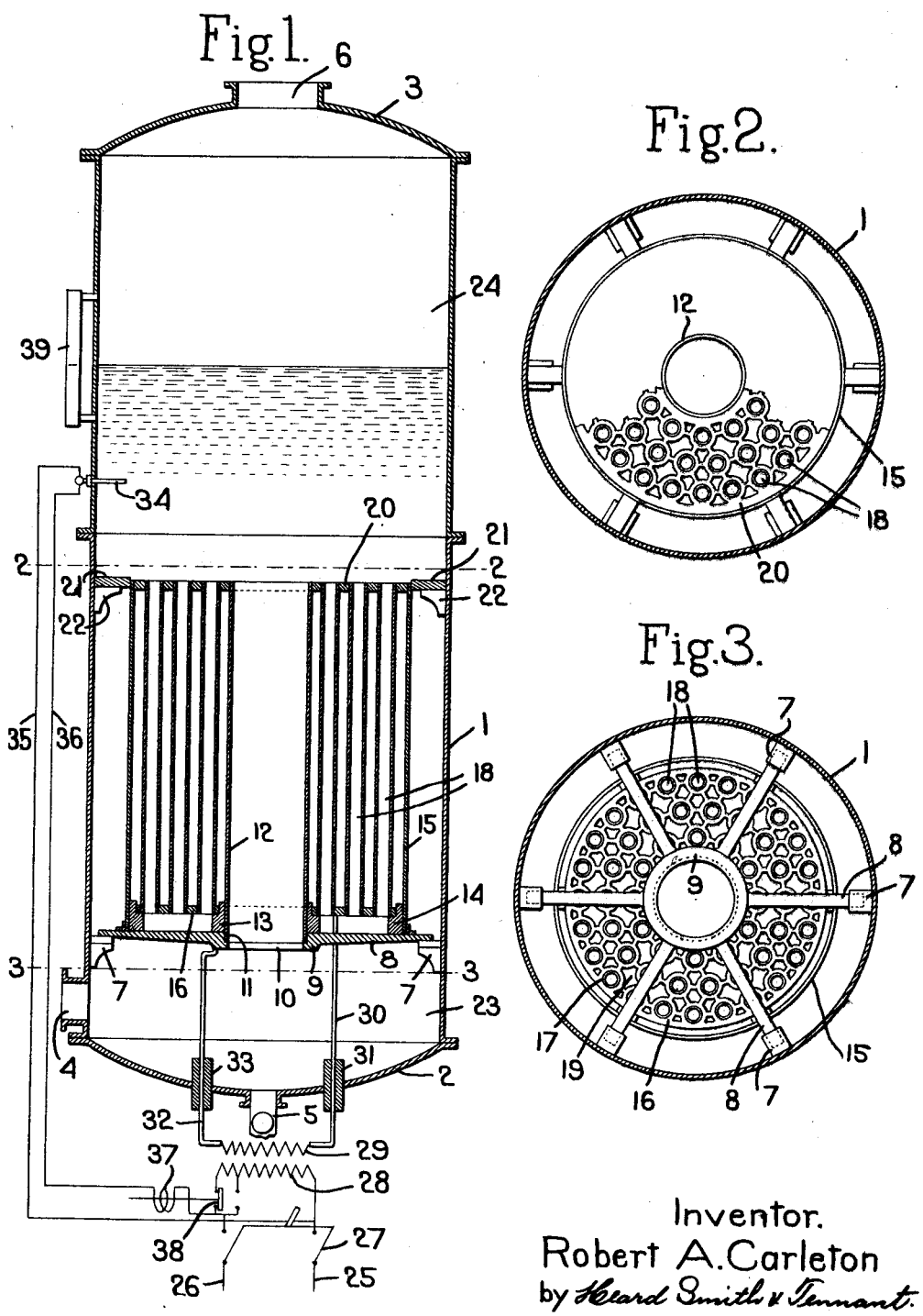
Inventor.
Robert A. Carleton
by Heard Smith & Tennant
Attys.

Sept. 10, 1929.   R. A. CARLETON   1,727,585
FLUID HEATING AND VAPORIZING APPARATUS
Filed Aug. 23, 1927   3 Sheets-Sheet 2
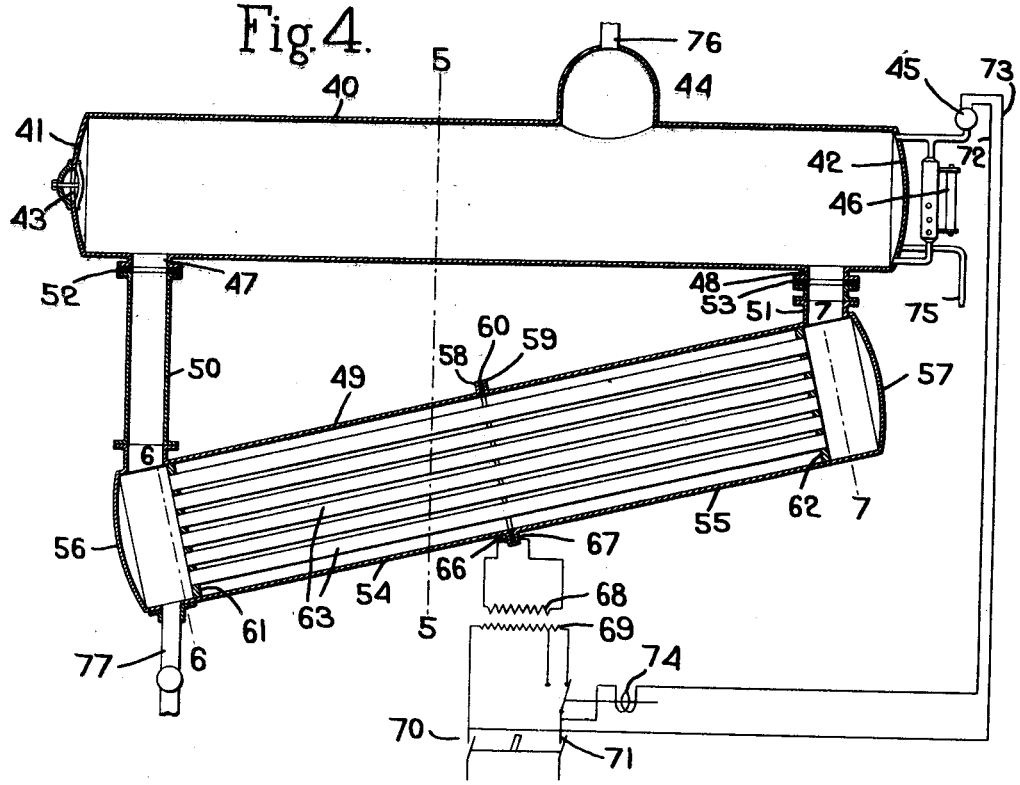
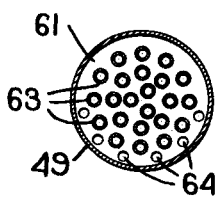
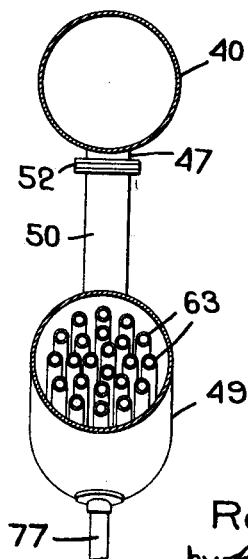
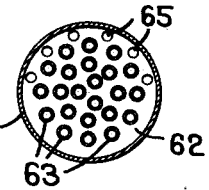
Inventor.
Robert A. Carleton
by Heard Smith & Tennant
Attys.

Sept. 10, 1929. R. A. CARLETON 1,727,585
FLUID HEATING AND VAPORIZING APPARATUS
Filed Aug. 23, 1927   3 Sheets-Sheet 3
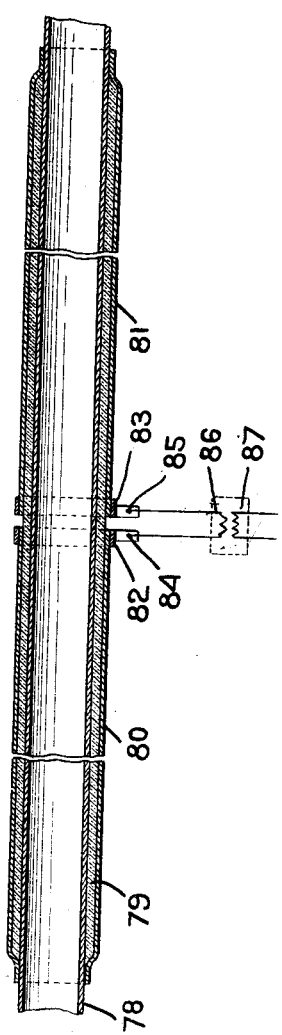
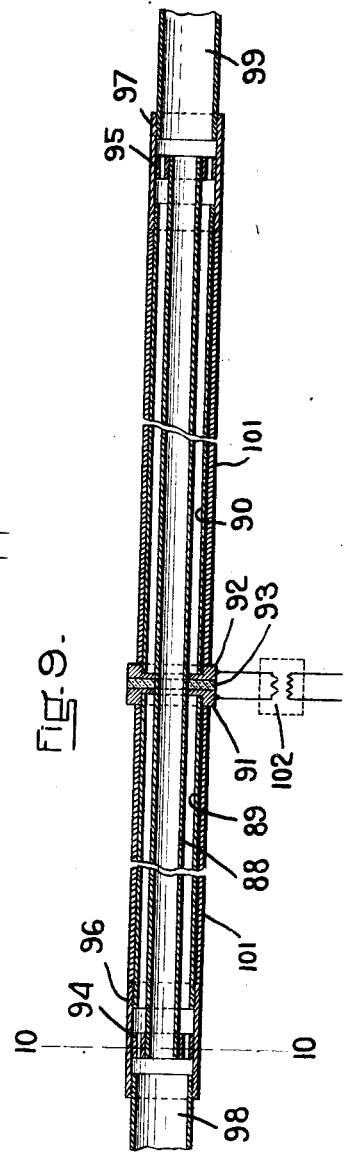
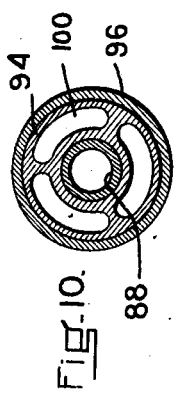
INVENTOR:
Robert A. Carleton
By Heard Smith & Tennant.
ATTORNEYS:

Patented Sept. 10, 1929.

1,727,585

UNITED STATES PATENT OFFICE.

ROBERT A. CARLETON, OF NEWTON CENTER, MASSACHUSETTS.

FLUID HEATING AND VAPORIZING APPARATUS.

Application filed August 23, 1927. Serial No. 214,973.

This invention relates to improvements in fluid-heating apparatus, in which the fluid is heated by one or more tubular heating elements forming a conduit or conduits for the fluid and having walls of relatively high resistance through which an electric current is passed, said electric current being of preferably low voltage and of sufficient amperage to raise the heating element to the desired degree of temperature.

This invention relates to certain improvements in my prior application, Serial No. 214,972, filed the twenty-third day of August, 1927.

The purpose of the invetnion is to provide an apparatus suitable for heating and evaporating or concentrating liquids, such as sugar, alcohol, brine, acids and the like, or for vaporizing liquids or generating steam.

One of the objects of the invention is to provide a rugged apparatus of simple and economical construction which will not be subject to chemical action of the fluids being treated and which can be readily built in units of any desired size or capacity.

A further object of the invention is to provide a fluid heating apparatus comprising a tubular heating element having a wall of relatively high resistance and a tubular low-resistance conductor for an electric current enclosing said heating element, electrically connected thereto and so arranged as to transmit the electric current in the opposite direction to that in which it passes through the heating element, whereby the effects of self-induction will be substantially neutralized.

A further object of the invention is to provide a fluid-heating apparatus comprising a tubular fluid-containing conductor for the electric current enclosing a tubular heating element with means for passing an electric current through said conductor and heating element in opposite directions, whereby the effects of self-induction will be neutralized and heat will be transmitted to the fluid from both the inner and outer surfaces of the wall of the heating element.

A further object of the invention is to provide an apparatus of the character described, in which the particular fluid-containing conductor encloses a plurality of tubular heating elements which are arranged in axial parallelism therewith, with means for causing a current of electricity to flow through the tubular low-resistance conductor and the tubular heating elements enclosed therein in opposite directions, whereby the effects of self-induction will be neutralized and the fluid caused to circulate in direct contact with the inner and outer walls of the heating element.

A further object of the invention is to provide an apparatus of the character described in which the electric current supplied to the heating elements is thermostatically controlled by the maximum temperature of the fluid or its vapors, whereby a substantially uniform heating of the fluid or its vapors will be maintained.

A further object of the invention is to supply an apparatus of the character specified with means operable by the flow of the fluid admitted into the apparatus to complete the electrical circuit through the heating elements and upon cessation of said flow to break the circuit, so that over-heating of the heating elements will be avoided.

These and other features of the invention will more fully appear from the following description and accompanying claims, and will be particularly pointed out in the claims.

Preferred forms of apparatus embodying the invention are illustrated in the accompanying drawings, in which Figure 1 is a vertical sectional view of an electric heating apparatus particularly designed for vaporizing liquids;

Fig. 2 is a transverse horizontal section on line 2—2, Fig. 1, viewed from the top;

Fig. 3 is a transverse sectional view on line 3—3, Fig. 1, viewed from the bottom;

Fig. 4 is a vertical sectional view of an embodiment of the invention particularly designed for the evaporization of liquids or the generation of steam;

Fig. 5 is a vertical sectional view on line 5—5, Fig. 4 of the apparatus shown in that figure;

Fig. 6 is a detail sectional view on line 6—6, Fig. 4, viewed from the left;

Fig. 7 is a detail sectional view on line 7—7, Fig. 4;

Fig. 8 is a longitudinal sectional view of one form of tubular heating element embodying the invention;

Fig. 9 is a longitudinal sectional view of a simple form of heating apparatus embodying the invention; and Fig. 10 is a transverse sectional view on line 10—10, Fig. 9.

The apparatus illustrated in Figs. 1 to 3 of the drawings, which, as above stated, is particularly designed for heating or evaporating and concentrating liquids, comprises a cylindrical receptacle 1 having a wall of steel or other material suitable for use with the liquid being heated and the pressure required in its treatment, and provided with heads 2 and 3.

The receptacle is provided with an inlet 4 through which fluid may be introduced into the receptacle.

The lower head desirably is provided with a blow-off 5 and the upper head 3 with an outlet 6 through which the vapors may be discharged. Brackets 7, which may be cast, welded or otherwise secured to the inside of the cylindrical wall of the receptacle 1, support a spider 8 having a downwardly-extending central boss 9, provided with a central opening 10 and having a counter-sunk wall 11 which serves as a seat for a cylindrical conductor 12 of low resistance material.

Supports 13 of insulating material supporting the cylindrical conductor 12 are seated upon the spider, and similar insulating supports 14 rest upon the arms of the spider 8 in proximity to the ends thereof. An outer tubular or cylindrical conductor 15 of low resistance material rests upon and is electrically connected to the arms 8 of the spider.

A metallic grid 16 which rests upon the insulating supports 13 and 14 is provided with a series of sockets 17 to receive and support the lower ends of a plurality of preferably circular series of tubular heating elements 18, the grid being provided with apertures 19 therebetween to permit circulation of the fluid through the grid. The upper ends of the tubular heating elements are mounted in a similar grid 20 which is supported by insulating supports 21 and which are supported upon a series of brackets 22.

The tubular heating elements are open at both ends and communicate at their lower ends with the chamber 23 of the receptacle and at their upper ends with a chamber 24 which forms a vapor space and with which the outlet 6 communicates.

The tubular heating elements have relatively thin walls of metal of relatively high electric resistance, such as Monel metal, one of the many chrome steel alloys, or other material having suitable resistance to corrosion by the liquid being treated.

Any suitable means may be provided for supplying an electric current to the heating element. In the preferred embodiment of the invention illustrated herein an alternating current is supplied through suitable conductors 25, 26 and a manually-operable switch 27 to the primary 28 of a step-down transformer.

One of the terminals of the secondary 29 of said transformer is connected, by a suitable conductor 30 which passes through an insulating bushing 31 in the head 2 of the receptacle, to the grid 16. The other terminal of the primary of the transformer is connected, by a suitable conductor 32 which passes through an insulating bushing 33 in the head 2, to the spider 8, which in turn is electrically connected to the low-resistance tubular members 12 and 15.

By reason of this construction, a circuit for the electric current is completed from the primary of the transformer, through the conductor 30, the tubular elements 18, the upper grid 20, the tubular low-resistance conductors 12 and 15, the spider 8, and conductor 32; and the current flowing through the circuit is thus caused to pass through the tubular heating elements 18 in the opposite direction from that in which it passes through the low-resistance conductors 12 and 15. Thus the effects of self-induction are greatly diminished or substantially neutralized.

Preferably thermostatic means subject to the maximum temperature of the fluid or the vapors therefrom are employed to control the current which is supplied to the heating elements, so that a substantially constant temperature may be maintained in the receptacle.

In the construction shown, a thermostat 34 extends into the fluid in the chamber above the upper end of the heating elements. When the temperature of the fluid exceeds a predetermined degree, the thermostat, which may be of usual type, operates to complete an electric circuit through the conductors 35 and 36 and the solenoid or magnetic coil 37 of a voltage regulator 38 so constructed as to cut in a predetermined number of the coils of the primary of the transformer, thereby reducing the current supplied to the heating elements.

Any other form of controlling mechanism may, of course, be employed.

The receptacle 1 may be provided with a water guage 39 and other usual equipment provided for heating and evaporating apparatus.

In the operation of the device, the heat delivered by the heating elements to the fluid causes the fluid to flow upwardly through and between the heating elements and to pass downwardly between the tubular low-resistance conductor 15 and the wall of the receptacle 1, and also downwardly through the tubular low-resistance conductor 12, thereby providing a continuous circulation.

The fluid thus circulating is heated by direct contact with both the inner and outer surfaces of the walls of the heating elements which, by reason of their comparatively large heating-surface area, are enabled to operate at a very high terminal efficiency, and as the walls of the heating elements may be made comparatively thin in cross-section because of the balance of internal and external pressure, the heat generated is transferred to the liquid at a high rate of speed.

Furthermore, the walls of the heating elements remain practically at the same temperature, or but slightly hotter than the temperature of the liquid, thus preventing overheating or decomposition of the liquid, or the formation of scale or undersirable gases.

The vapor formed from the liquid passes into the vapor space in the upper portion of the receptacle, and therefrom through the outlet 6 in the upper head 3.

In usual evaporating apparatus, steam is employed, in which the temperature available for heating is limited to steam temperature, which, at atmospheric pressure, is but 212° F. If higher temperatures are desired, steam under pressure must be used, and the heated tubular walls must be of considerable thickness to obtain the requisite strength. The thermal efficiency of such arrangements is low as compared with that of the present invention, because of the low coefficient of heat transfer from the steam through the walls of the tube to the liquid being heated, the presence of scale or deposits on the surface of the tubes and entrained gas and air, and water or condensate, all of which conditions combine to make the operation slow, and require that the evaporator be arranged with a comparatively large area of heating surface in order to obtain the required heating effect.

In the electrically-heated evaporator herein described, not only is the heating surface practically doubled, because of the arrangement which allows both the inner and outer surfaces to be used for transmitting heat to the liquid, but any desired temperature can be obtained by regulating the flow of current through the heating elements, and the temperature can be controlled and maintained at any predetermined degree of heat.

Furthermore, the apparatus can be operated to produce a high degree of heat at atmospheric pressure, making it possible to construct apparatus of this type in larger capacities and at lower cost than has heretofore been possible.

In Figs. 4, 5, 6 and 7, a modified form of the invention is illustrated which is designed for heating water or other liquids, but more particularly for vaporizing liquids.

This apparatus comprises a preferably horizontal tank 40 of steel or other suitable metal provided with heads 41 and 42, one of which has a manhole 43, for cleaning and other purposes, a vapor or a steam drum 44, a pressure regulator 45, a gauge-glass or a water column 46, and other usual boiler equipment, with conduits 47, 48 extending from the bottom thereof and communicating with a fluid-heater.

The fluid-heater comprises a cylindrical tank 49 of steel or other material suited to the liquid being heated and the pressure employed, preferably arranged in an inclined position beneath the tank 40 and having at its ends conduits 50 and 51 communicating with the conduits 47 and 48, respectively, with gaskets 52 and 53 of insulating material therebetween.

The wall of the cylindrical tank 49 desirably is formed in two axially-aligned sections 54 and 55 of metal having relatively low resistance, and provided at their remote ends, respectively, with heads 56 and 57 and at their adjacent ends with outwardly-extending annular flanges 58 and 59, which are separated by a gasket 60 of insulating material and connected together by insulating bolts to form a water-tight joint.

Header plates 61 and 62 of low resistance material extend transversely of the tank 49 in proximity to the ends thereof and are welded or otherwise electrically connected to the inner walls of the sections 54 and 55 of the tank.

Tubular heating elements 63 composed of a metal of comparatively high electrical resistance, such as Monel metal, one of the many chrome nicked steel alloys, or other material having suitable resistance to corrosion by the liquid being heated, are mounted at their ends in the header plates 61 and 62. The tubular heating elements 63 are open at their ends and communicate, respectively, with the spaces between the grids 61 and 62 and the heads 56 and 57 of the heater, so that a circulation of the fluid will be caused through the heating elements, the conduits 51 and 48, the tank 40 and the conduits 47 and 50 when heat is transmitted to the fluid from the heating elements.

In order to provide for the circulation of the fluid through the intermediate portion of the tank 49, so that the fluid may be heated by direct contact with the exterior surfaces of the walls of the heating elements and external and internal pressure upon the walls of the heating elements equalized, the header 61 is provided, preferably along its lower portion, with a plurality of apertures 64, and the header plate 62 is also provided, preferably along its upper portions, with like apertures 65.

Any suitable means may be provided for supplying an electric heating current to the heating elements. In the preferred construction illustrated herein, the walls 54 and 55 of the tank 49, which are of metal having low electrical resistance, are used as conductors. The flanges 58 and 59 of these sections are of low resistance metal and are provided with suitable terminals or lugs 66 and 67 through which current is supplied from a suitable source.

The electric circuit therefore comprises the flanges 58 and 59, the walls of the sections 54 and 55 of the tank, the headers 61 and 62 and the high resistance tubular heating elements 63. Preferably the current is supplied to the terminals 66 and 67 from the secondary of a transformer 68, the primary 69 of which is supplied through service wires 70 and 71 from a suitable alternating current generator.

Desirable means are employed for regulating the current to maintain a substantially uniform rate of evaporation of the fluid with a uniform pressure thereof or a uniform temperature. This is accomplished by providing a suitable pressure regulator 45 in a conduit communicating with the upper portion of the upper tank 40. This regulator may be of any suitable character adapted, when the pressure or temperature exceeds a predetermined amount, to complete an electric circuit through conductors 72, 73 and the solenoid or magnet 74 of the voltage regulator, which may be of any suitable type, but which is diagrammatically illustrated herein as one adapted to vary the number of primary coils of the transformer, thereby, in turn, varying the current supplied from the secondary of the transformer.

In the operation of the device, the electrical current flowing, for example, from the secondary of the transformer to the terminal 66, passes through the exterior tubular conductor 54, the header plate 61, the tubular heating elements 63, the header plate 62 and the exterior tubular conductor 55 to the terminal 67 and thence to the secondary. By this arrangement the current, which desirably is of considerable amperage, but of comparatively low voltage, goes in the opposite direction in the sections 54 and 55 of the outer conduit to that in which it flows in the corresponding enclosed sections of the tubular heating element, thereby acting to neutralize to a great extent the effects of self-induction, so that the circuit will operate at a high power factor.

The fluid desirably is supplied to the upper tank through an inlet pipe 75, which enters the lower portion of the tank. When suitable heating current is supplied to the heating elements, the radiation thereof causes a circulation of the fluid upwardly through the heating elements, thence through the conduits 51 and 48, to the upper tank 40. Such movement of the fluid causes a downward flow thereof through the conduits 47 and 48 to the inlet end of the tank 49. Thus a continuous circulation of the fluid is maintained through the tanks 40 and 49, and the liquid vaporized. The vapors thereof accumulate in the upper portion of the tank 40 and the dome 44 and may be delivered therefrom through a suitable outlet pipe or pipes 76 communicating with the upper portion of the drum 40 or its dome 44.

The lower tank 49 desirably is provided with a blow-off 77 through which any sediment may be removed from the lower tank.

The construction herein described provides an efficient heater for liquids having a very high rate of heat transfer, and one which can be constructed or produced at a low price in any capacity.

The heating elements, which are immersed in the liquid being heated, are of a material not easily affected or corroded by the liquid being heated and are practically indestructible, therefore requiring little or no attention or repairs.

Simplified forms of heating constructions adapted for continuously heating a column of liquid are illustrated in Fig. 9 of the drawings.

The construction shown in Fig. 8 comprises a tubular heating element 78 having a wall of relatively high resistance material, such as Monel metal, chrome nickel steel alloys or other material having suitable resistance to corrosion by the liquid being heated, which is enclosed in a jacket of insulating material 79. The insulating jacket 79 is surrounded by a tubular electric conductor of low resistance material formed in sections 80 and 81, the adjacent ends of which are electrically connected, preferably by bands of low resistance metal 82 and 83 having suitable terminals 84 and 85 to the secondary 86 of a transformer, the primary 87 of which is supplied with an alternating current from a suitable source of electricity.

The remote ends of the conductor sections 80 and 81 are electrically connected to the heating element 78. In the operation of the device, therefore, the current flows from the secondary of the transformer through the terminal 84 and its band 85, through the low resistance conductor section 80, thence through the heating element 78, and returns through the low resistance conductor section 81, band 84 and its terminal 85, to the secondary. By virtue of this construction, the current will flow through the outer low resistance conductor sections in the opposite direction from that in which it flows through the sections of the heating element which are enclosed thereby. The effects of self-induction will, therefore, be substantially neutralized.

In Fig. 9 another simple embodiment of the invention is illustrated, in which a tubular heating element 88 having a wall of Monel metal or other high resistance material is enclosed within and preferably is concentrically of an exterior conductor formed in sections 89 and 90, the adjacent ends of which are connected to flanges 91 and 92 which are electrically insulated from each other by a gasket 93 of suitable insulating material.

The remote ends of the tubular heating member 88 are mounted in suitable headers 94 and 95 which, for convenience in assembling, are contained in sleeves 96 and 97 having, respectively, screw-threaded ends for coupling the same to the conductors 88 and 89 and to the conduit section 98 and 99 through which fluid is supplied and delivered, respectively. The headers 94 and 95 are identical and are provided with apertures 100 to permit the fluid to flow freely through the headers, so that the fluid may flow continuously through the space between the heating element 88 and the outer conductor which is formed of the sections 89 and 90. Thus the fluid is heated by direct contact with the inner and outer surfaces of the walls of the heating element 88. The outer tubular conductor sections 89, 90 may be of low resistance material, as aforesaid, or, if greater capacity is required, the outer tubular conductor sections 89 and 90 may also be of high resistance material, such as Monel metal.

Desirably, the outer tubular conductor sections 89 and 90 are enclosed in a sheathing of insulating material 101, so that radiation of heat to the atmosphere will be substantially prevented.

Any suitable means may be employed for supplying an electric heating current to the heating element or elements. In the construction disclosed herein the headers 91 and 92 are electrically connected to the primary 102 of a step-down transformer, the primary 103 of which is supplied from a suitable source of electrical energy.

The operation of the construction illustrated in Fig. 9 is in all respects similar to that described with respect to the construction disclosed in Fig. 8, with the exception that the column of fluid is divided into two concentric columns which surround the inner tubular heating element, so that the fluid comes in direct contact with both the inner and outer walls of the inner heating element.

Furthermore, if the exterior tubular conductor sections 89 and 90 are also of high resistance material, additional heat will be delivered to the fluid flowing between the inner heating element and the outer conductor. In this construction, as in the other, the electric current flows through the exterior conductors 89 and 90 in the opposite direction to that in which it flows through the corresponding enclosed sections of the inner tubular heating element, so that the effects of self-induction are substantially neutralized.

It will be observed that the constructions disclosed in Figs. 8 and 9 are in all respects similar in operation to the constructions disclosed in both the other types of apparatus, in that in each case the current is caused to flow through an exterior tubular conductor in the opposite direction to that in which it flows through the enclosed heating element or elements.

In all cases, therefore, the arrangement is such as to overcome substantially the effects of self-induction. Other similarities in construction will be readily obvious upon comparison of the drawings and descriptions.

Any suitable electric current, either direct or alternating, may be employed. Preferably a relatively low tension alternating current is used and such a current may be supplied from the secondary of a transformer of any usual type, either single phase or polyphase.

It will be understood that the embodiments of the invention particularly disclosed herein are of an illustrative character and are not restrictive, and various changes in form, construction and arrangement of parts may be made within the spirit and scope of the invention.

Having thus described the invention, what is claimed as new, and desired to be secured by Letters Patent, is:

1. A fluid-heating apparatus comprising a tubular heating element having a wall of high resistance material and a low resistance conductor for an electric current surrounding said heating element and connected thereto and arranged in substantially axial parallelism therewith, means for passing an alternating electric current through said low resistance conductor and said heating element in opposite directions throughout the effective length of said heating element, whereby the effects of self-induction will be neutralized, and means for causing the fluid to flow through said tubular heating element.

2. A fluid-heating apparatus comprising a tubular heating element having a wall of relatively high resistance material, a low resistance tubular conductor for an electric current enclosing said heating element and electrically connected at one end thereto, means for passing an alternating electric current through said low resistance conductor and heating element in opposite directions throughout the effective length of said heating element, whereby effects of self-induction will be neutralized, and means for causing the fluid to flow through said tubular low resistance conductor and said tubular heating element.

3. A tubular fluid-heating apparatus comprising an outer fluid-containing electric conductor, a tubular heating element, having a wall of high resistance material enclosed within said outer tubular conductor, open at its ends and immersed in said fluid in said outer conductor, means for passing an alternating electric current through said outer conductor and heating element, whereby heat will be transmitted to the fluid from both the inner and outer surfaces of the wall of said heating element and means for causing the fluid to flow through said outer conduit and said heating element in the same direction.

4. A fluid-heating apparatus comprising an outer tubular fluid-containing electric conductor having a wall of low resistance material, an inner tubular heating element having a wall of relatively high resistance material arranged in substantially axial parallelism therewith, means for passing an alternating electric current through said low resistance conductor and heating element in opposite directions throughout the effective length of said heating element, to neutralize the effects of self-induction, and means for causing the fluid to flow both through said conductor and heating element in the same direction, whereby heat will be transmitted to the flowing fluid from both the inner and outer surfaces of the wall of said heating element.

5. A fluid-heating apparatus comprising an outer tubular fluid-containing electric conductor having a wall of low resistance material, a plurality of tubular heating elements therein having walls of relatively high resistance material arranged in substantially axial parallelism therewith, means for supplying an alternating electric current to said outer conductor, means for causing it to pass through said heating elements in opposite direction to that in which it passes through the outer low resistance conductor, and means causing the fluid contained in the outer conductor to flow between and in contact with the outer walls of said tubular heating elements in the same direction as the direction of flow of the fluid within said tubular heating elements.

6. A fluid-heating apparatus comprising an outer tubular fluid-containing conductor having a wall of low resistance material, a plurality of tubular heating elements immersed in said fluid and communicating at their end with said outer conductor and having walls of relatively high resistance material arranged in substantial parallelism therewith, means for causing an electric current to pass through said conductor in one direction and through said heating elements in multiple in the opposite directions, means for introducing fluid at one end of said outer conductor and means for delivering the fluid or its vapors from the opposite end thereof 7. A fluid-heating apparatus comprising an outer tubular fluid-containing electric conductor having a wall of low resistance material, a plurality of tubular heating elements having walls of relatively high resistance material arranged in axial parallelism with said outer conductor, insulated therefrom and communicating at like ends therewith, a source of electrical energy, means for conducting an electric current therefrom to one end of said outer conductor, means connecting the other end of said outer conductor with the adjacent ends of said tubular heating elements, a return conductor leading from the opposite end of said heating elements to said source of electrical energy, means for introducing fluid at one end of said outer conductor, and means for delivering the fluid or its vapors from the other end thereof.

8. A fluid-heating apparatus comprising an outer tubular fluid-containing electric conductor having a wall of low resistance material, a plurality of tubular heating elements having walls of relatively high resistance material arranged in axial parallelism with said outer conductor, insulated therefrom and communicating at like ends therewith, a source of electrical energy, means for conducting an electric current therefrom to one end of said outer conductor, means connecting the other end of said outer conductor with the adjacent ends of said tubular heating elements, a return conductor leading from the opposite end of said heating elements to said source of electrical energy, means for introducing fluid at one end of said outer conductor, means for delivering the fluid or its vapors from the outer end thereof, thermostatic means subject to the temperature of the discharging fluid, and means operable thereby to regulate the current supplied from said source of energy to said heating elements.

9. A fluid-heating apparatus comprising a cylindrical receptacle having grids extending transversely thereof and insulated therefrom, a plurality of tubular heating elements mounted in said grids, electrically connected thereto and communicating at their ends with said receptacle, said receptacle having tubular conducting means of low resistance surrounding said heating elements and electrically connected at one end to one of said grids, means for causing an electric current to flow through said low resistance tubular conducting means and said heating elements in opposite directions, and means for causing the fluid to flow through said heating elements.

10. A fluid-heating apparatus comprising a cylindrical receptacle having grids extending transversely thereof and insulated therefrom, a plurality of tubular heating elements mounted in said grids, electrically connected thereto and communicating at their ends with said receptacle, said receptacle having tubular conducting means of low resistance surrounding said heating elements and electrically connected at one end to one of said grids, means for causing an electric current to flow through said low resistance tubular conducting means and said heating elements in opposite directions, means for causing the fluid to flow through said heating elements and a chamber to receive the vapors of said fluid discharged from said heating elements.

11. A fluid-heating apparatus comprising an outer fluid-containing conductor formed in axially-aligned, connected sections, means electrically insulating said sections from each other, a tubular heating element within said conductor having a wall of relatively high resistance material arranged in substantially axial parallelism with said outer conductor, insulated therefrom and communicating at its ends therewith, a source of electrical energy, conductors leading therefrom to the adjacent ends of said outer tubular conductor sections, means connecting the remote ends of said sections to the respective adjacent ends of said heating element, means for introducing fluid at one end of said outer tubular conductor, and means for delivering the fluid or its vapor from the other end thereof.

12. A fluid-heating apparatus comprising an outer fluid-containing conductor formed in axially-aligned, connected sections, means electrically insulating said sections from each other, a tubular heating element within said conductor having a wall of relatively high resistance material arranged in substantially axial parallelism with said outer conductor, insulated therefrom and communicating at its ends therewith, a source of electrical energy, conductors leading therefrom to the adjacent ends of said outer tubular conductor sections, means connecting the remote ends of said sections to the respective adjacent ends of said heating element, means for introducing fluid at one end of said outer tubular conductor, means for delivering the fluid or its vapors from the other end thereof, and means operable by the condition of the fluid or its vapors for controlling the current supplied to said heating element.

13. A fluid-heating apparatus comprising a cylindrical receptacle having a wall of low resistance material formed in axially-aligned connected sections providing an outer tubular electric conductor, means electrically insulating said sections from each other, a plurality of tubular heating elements having walls of relatively high resistance material within said outer conductor arranged in substantially axial parallelism with said outer conductor, insulated therefrom and communicating at their ends therewith, a source of electrical energy, conductors leading therefrom to the adjacent ends of said outer tubular conductor sections, means connecting the remote ends of said sections to the respective adjacent ends of said heating elements, means for introducing the fluid at one end of said tubular fluid-containing receptacle and means for delivering the fluid or its vapors from the other end thereof.

14. A fluid-heating apparatus comprising a cylindrical receptacle having a wall of low resistance material formed in axially-aligned connected sections providing an outer tubular electric conductor, means electrically insulating said sections from each other, a plurality of tubular heating elements having walls of relatively high resistance material within said outer conductor arranged in substantially axial parallelism with said outer conductor, insulated therefrom and communicating at their ends therewith, a source of electrical energy, conductors leading therefrom to the adjacent ends of said outer tubular conductor sections, means connecting the remote ends of said sections to the respective adjacent ends of said heating elements, means for introducing the fluid at one end of said fluid-containing receptacle, means for delivering the fluid or its vapors from the other end thereof, and means for circulating the fluid through and around said heating elements.

15. A fluid-heating apparatus comprising a fluid-containing receptacle having an inlet and an outlet and comprising a cylindrical wall of low resistance material, a plurality of tubular heating elements having walls of relatively high resistance material arranged in substantially axial alignment with said cylindrical wall, extending a portion of the length of said receptacle and immersed in the fluid therein, supporting grids for the ends of said tubular heating members extending transversely of said tubular conductor, means for passing an electric current of relatively low potential and high amperage through said cylindrical wall of low resistance and through said heating elements in opposite directions, whereby the effects of self-induction will be substantially neutralized, and means for causing the circulation of the fluid through and around said heating elements, whereby heat will be transmitted to the fluid from the inner and outer walls thereof by direct contact therewith.

16. A fluid-heating apparatus comprising a fluid-containing receptacle having an inlet and an outlet and comprising a cylindrical wall of low resistance material, a plurality of tubular heating elements having walls of relatively high resistance material arranged in substantially axial alignment with said cylindrical wall, extending a portion of the length of said receptacle and immersed in the fluid therein, supporting grids for the ends of said tubular heating members extending transversely of said receptacle, means for passing an electric current of relatively low potential and high amperage through said cylindrical wall of low resistance and through said heating elements in opposite directions, whereby the effects of self-induction will be substantially neutralized, means for causing the circulation of the fluid through and around said heating elements, whereby heat will be transmitted to the fluid from the inner and outer walls thereof by direct contact therewith, and means subject to the influence of the condition of the fluid within said receptacle to control the current supplied to the heating elements.

In testimony whereof, I have signed my name to this specification.

ROBERT A. CARLETON.